United States Patent [19]
Saunders

[11] Patent Number: 5,959,219
[45] Date of Patent: Sep. 28, 1999

[54] CAPACITIVE GAS FLOW SENSOR

[76] Inventor: David N. Saunders, 82 Industrial Park Dr., Saco, Me. 04072

[21] Appl. No.: 08/901,373

[22] Filed: Jul. 28, 1997

[51] Int. Cl.[6] .................................. G01F 1/28; G01F 1/37
[52] U.S. Cl. ...................................... 73/861.74; 73/861.52
[58] Field of Search ............................ 73/861.74, 861.71, 73/861.75, 861.52

[56] References Cited

U.S. PATENT DOCUMENTS

| | | | |
|---|---|---|---|
| 3,424,000 | 1/1969 | Chelner | 73/861.74 |
| 4,599,907 | 7/1986 | Kraus et al. | 73/861.74 |
| 4,625,565 | 12/1986 | Wada et al. | 73/861.74 |
| 4,716,770 | 1/1988 | Herzog | 73/861.24 |
| 5,003,810 | 4/1991 | Jepson et al. | 73/861.74 |
| 5,663,508 | 9/1997 | Sparks | 73/861.74 |

FOREIGN PATENT DOCUMENTS 0 239 703   7/1987   European Pat. Off. .

*Primary Examiner*—Harshad Patel
*Attorney, Agent, or Firm*—Thomas L. Bohan

[57] ABSTRACT

A gas flow sensor particularly useful for the measurement of relatively low flow rates. The sensor includes a flexible vane affixed to a substrate. One end of the vane is conductive and is permitted to move with the flexing of the vane. That end of the vane forms part of one or more capacitors such that as the vane bends with the flow of gas therethrough, the capacitive value changes. The gas flow rate can then be determined using well-known circuitry. The vane includes a flow-restriction section to allow the gas to flow through. The vane is designed of a material and a configuration to ensure that it bends under very low flow conditions.

23 Claims, 2 Drawing Sheets

CAPACITIVE GAS FLOW SENSOR

BACKGROUND OF THE INVENTION

1. Field of the Invention

The present invention relates to devices for measuring airflow rates. More particularly, the present invention relates to devices for measuring airflow rates using a capacitive device. Still more particularly, the present invention is a relatively inexpensive system designed for reliable accuracy at very low flow rates.

2. Description of the Prior Art

The flow rates of gases are of significant importance in a wide variety of medical and industrial applications. For the purpose of the description of the present invention, "gas" means any non-liquid fluid, including, but not limited to air. It is often necessary to measure gas flow rate to ensure that an expected volume of gas desired to be specifically transferred from one location to another is the volume required for an intended purpose. Alternatively, it may be necessary to undertake such measurement to determine the amount of what would otherwise be an unknown volume of gas so as to evaluate the effect of that transferred gas in a particular application.

One area among many others in which gas—air in particular—flow rates are of importance is the medical field. Another area where gas flow rates are of importance is in laboratory fume hoods. Laboratory fume hoods are used to protect laboratory personnel from exposure to toxic and pathogenic substances. Proper operation of the fume hood relies on a specific air flow rate at the opening of the fume hood and at other locations within the hood. If the air flow rate is too low, the hood does not provide adequate isolation of the substances contained therein. If the flow rate is too high, the substances may be contaminated or otherwise compromised by the entry of ambient laboratory air.

As often as not, these hoods or cabinets include fans that blow from one confined area through a working area section and into an exhaust section. Holes created between the respective sections can be used to evaluate gas flow rates as indicators of the pressure differential between those sections. It is therefore critical to measure gas flow rates in these cabinets in order to determine whether the pressure differential meets a particular design point. If the rate is too low, the hood is not safe for laboratory personnel. If it is too high, the experiment being conducted in the working section of the cabinet may be compromised. It is therefore important to set design gas flow rates and to ensure that they are maintained. As a result of these requirements, gas flow measurement devices have been developed, including those designed to measure airflow rates.

In addition to the use of anemometers, rotary, and sonic systems, among others, a number of the prior gas flow measurements devices have been based on the use of a pressure sensor. A pressure sensor is configured to respond to some pressure differential created by the flow of a gas. Low gas flows create small pressure differentials. Low-pressure range transducers are more difficult and expensive to fabricate and are subject to thermally-induced errors. As much as they are designed to compensate to minimize the effects of ambient temperatures, practical and commercially-available pressure transducers exhibit a significant temperature coefficient. That is, the results obtained from such transducers vary widely as a function of temperature variations. This limits their usefulness in measuring low flow rates, where variations are more significant.

Another type of gas flow measurement device is the capacitive sensor. This type of sensor also includes an electrically-conductive component designed to move with the movement of gas passing by. However, the moving component is made part of an electrical circuit such that when the position of the component changes, an insulative gap between it and another electrically-conductive component of fixed position also changes. The resultant change in capacitance is used to determine a gas flow rate. Several such devices have been previously described. U.S. Pat. No. 4,599,907 issued to Kraus et al. describes a mass-flow sensor including a flexible plate positioned in the field of the gas flow, and a fixed plate. The combination of plates produces a variable capacitor. The mass flow rate of the gas is proportional to the rate of change of the measured capacitance. U.S. Pat. No. 5,003,810 issued to Jepson et al. describes a mass flow meter for gases. The device uses a plate located in a flow stream and coupled to circuitry for evaluation of capacitive changes. European Patent Application No. 86309946.1 describes a capacitive device including a semiconductor element and a flexible beam, the movement of which results in a change in capacitance.

An important limitation of these and other prior-art devices is the accuracy of measurement for very low flow rates, namely, for flow rates on the order of 300 feet per minute or less. When the flow rate to be maintained or otherwise determined is that low, the designs of the prior devices restrict their usefulness. Among other things, the movable components of such devices may be too stiff at such rates, in order not to be too flexible at higher flow rates. In addition, at low flow rates, the movable component will have an effect on the flow rate and therefore render its measurement relatively inaccurate. Further, the devices presently available for very low flow rate measurements tend to be relatively expensive in that they often rely upon sophisticated circuitry and software to account for the deficiencies in their structural components. Such device sophistication can lead to high maintenance requirements and to the need for sophisticated operators.

Therefore, what is needed is a device for accurate measurement of gas flow rates at relatively low flow rates. What is also needed is such a device that is relatively temperature insensitive. Further, what is needed is such a device that is relatively easy to fabricate and use in a cost-effective way.

SUMMARY OF THE INVENTION

It is an object of the present invention to provide a device for accurate measurement of gas flow rates, and in particular, at relatively low flow rates. It is also an object of the present invention to provide such a device that has a low temperature coefficient, or that is relatively temperature insensitive. Further, it is an object of the present invention to provide such a device that is relatively easy to fabricate and use.

These and other objectives are achieved in the present invention, which is a capacitive device, through the use of a flexible vane having a flow-restrictive section through which the gas—air in most cases—to be measured passes. In a typical application, the device is mounted in a wall dividing two chambers, so as to introduce a "leak" between the two chambers and a consequent flow of gas from the chamber with the higher pressure to the chamber with the lower pressure. It is this flow that is measured by the present invention. A circuit board forms part of the device in that it is electrically coupled to the capacitive element, of which the flexible vane is one part. The circuit board includes a pass-through opening through which the gas to be measured passes. The board's opening and the flow-restrictive section of the vane are aligned such that the gas passing through one passes through the other. The gas flow through the smaller restrictive section of the device into a larger opening gives rise to a differential pressure resulting from the change in velocity of the gas flow. It is this differential pressure and consequent differential force that causes the vane to deflect. In the alternative, it is envisioned that the gas flow being measured need not pass through a pass-through hole of the circuit board but may instead be forced to flow in an alternate path which includes the flexible vane and not the board.

The flexible vane is designed to have one end in a fixed position and one end unfixed so that it may move with the flexing of the vane. That flexing is caused by movement of gas through the flow-restrictive section. The flexible vane is designed to be conductive at the "floating" end such that that portion of it may form one conductive plate of the capacitive element of the device. A fixed component forms the other conductive plate, with a gap between the two. Optionally, and preferably, another fixed plate may be used to form a second capacitive section, wherein the vane is positioned between the two fixed plates. The result is the capability to obtain a differential capacitance measurement when the vane moves. That is, as a gas moves through the flow-restrictive section of the vane, the floating end moves toward one of the fixed conductive plates and away from the other. The difference in capacitance change between the two is then used to identify gas flow rate.

Although the electrical output associated with the device of the present invention may be used in any number of well-known circuitry arrangements, it is preferably used with an oscillator. In that arrangement, the measured capacitance obtained from the components described is one input to the oscillator, while the fixed end of the vane is grounded. If two fixed conductive plates are used with two oscillators, the gas flow is related to the difference in frequencies obtained from the two measured capacitances. Specifically, the device is calibrated through empirical means to obtain gas flow rate in some measure, such as feet/minute, as a function of the frequency output by the oscillator, or by the difference in frequencies in the case of the use of two conductive plates. Since the cross-sectional area of the flow-restrictive section is known, the quantity of gas passing through during the time period measured can be easily calculated. Such calculations may be made using standard circuitry forming a portion of the circuit board of the device.

It is important to note that the flexible vane must be flexible enough to move measurably under very small gas flow rates. However, the vane must be stiff enough that it does not bend under its own weight, nor beyond its elastic limit under higher flow rates. There are a variety of ways that this may be achieved, as by the selection of the particular material used to make the vane, the configuration and orientation of the vane, and by the use of means for restricting its movement at the fixed end as well as at the floating end. It is also important to ensure that the dimensions of the vane, including the dimensions of the flow-restrictive section, are accurate. In that regard, the vane of the present invention is preferably fabricated of steel and etched to achieve a certain thickness uniformity and accurately-formed flow-through holes. In this way, the device of the present invention may be simply produced but with highly-accurate measurement capability.

These and other objectives and advantages of the present invention will become apparent to those skilled in the art upon review of the accompanying drawing, the detailed description of the invention, and the appended claims.

DETAILED DESCRIPTION OF THE PREFERRED EMBODIMENT

Figure 1:
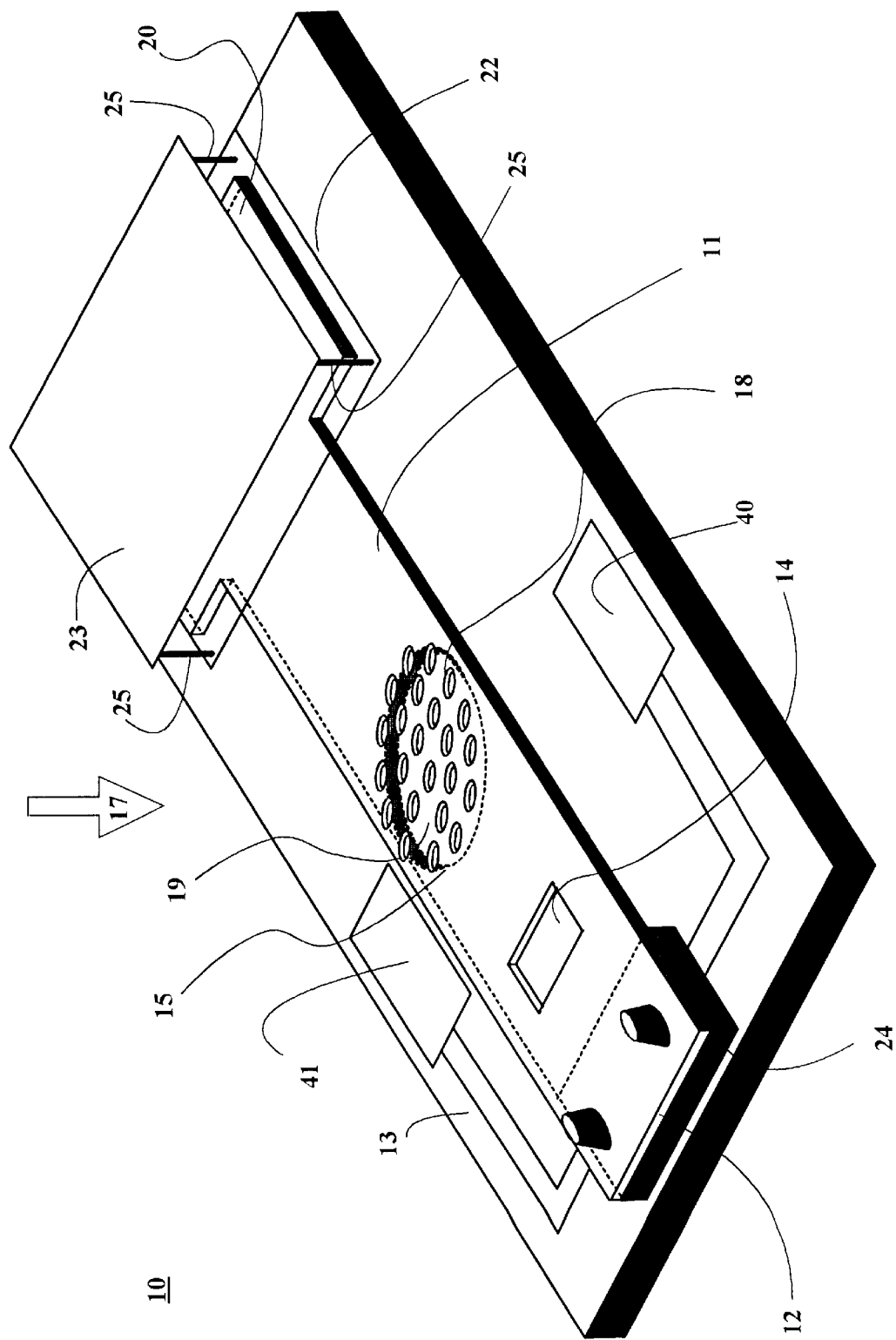
FIG. 1 is a perspective view of the present invention's preferred embodiment.

A gas flow sensor 10 of the present invention is shown in FIG. 1. The sensor 10 includes a flexible vane 11 having a fixed end 12 clamped or otherwise fixed to a circuit board 13 that is parallel, to the vane 11. While this arrangement between the vane 11 and the board 13 provides the most compact sensor 10, it is contemplated that the two may be remote from one another and an alternative substrate may be used to support the vane 11 in some way.

In the preferred embodiment of the invention, the vane 11 includes a flex hole 14 designed to reduce the bending stiffness of the vane 11 with minimal effect on resistance to vane twisting. However, it is to be understood that the flex hole 14 may not be necessary, or alternative designs for reducing bending stiffness may be provided, as a function of the material selected for fabricating the vane 11.

A key component of the vane 11 is a flow-restrictive section 15. The flow-restrictive section 15 permits gas, identified by flow direction at 17, to pass through the vane 11. The section 15 is preferably fabricated as a plurality of restrictor holes 18; however, alternative means for restricting flow are contemplated, provided such means effects bending of the vane 11 in a manner sufficient to ensure a change in capacitance. It is to be noted that the gas is permitted to pass completely and freely through the section 15 by modification of the board 13 for the arrangement illustrated. Specifically, a pass-through hole 19 allows the gas to pass through the vane 11 and the board 13.

Figure 2:
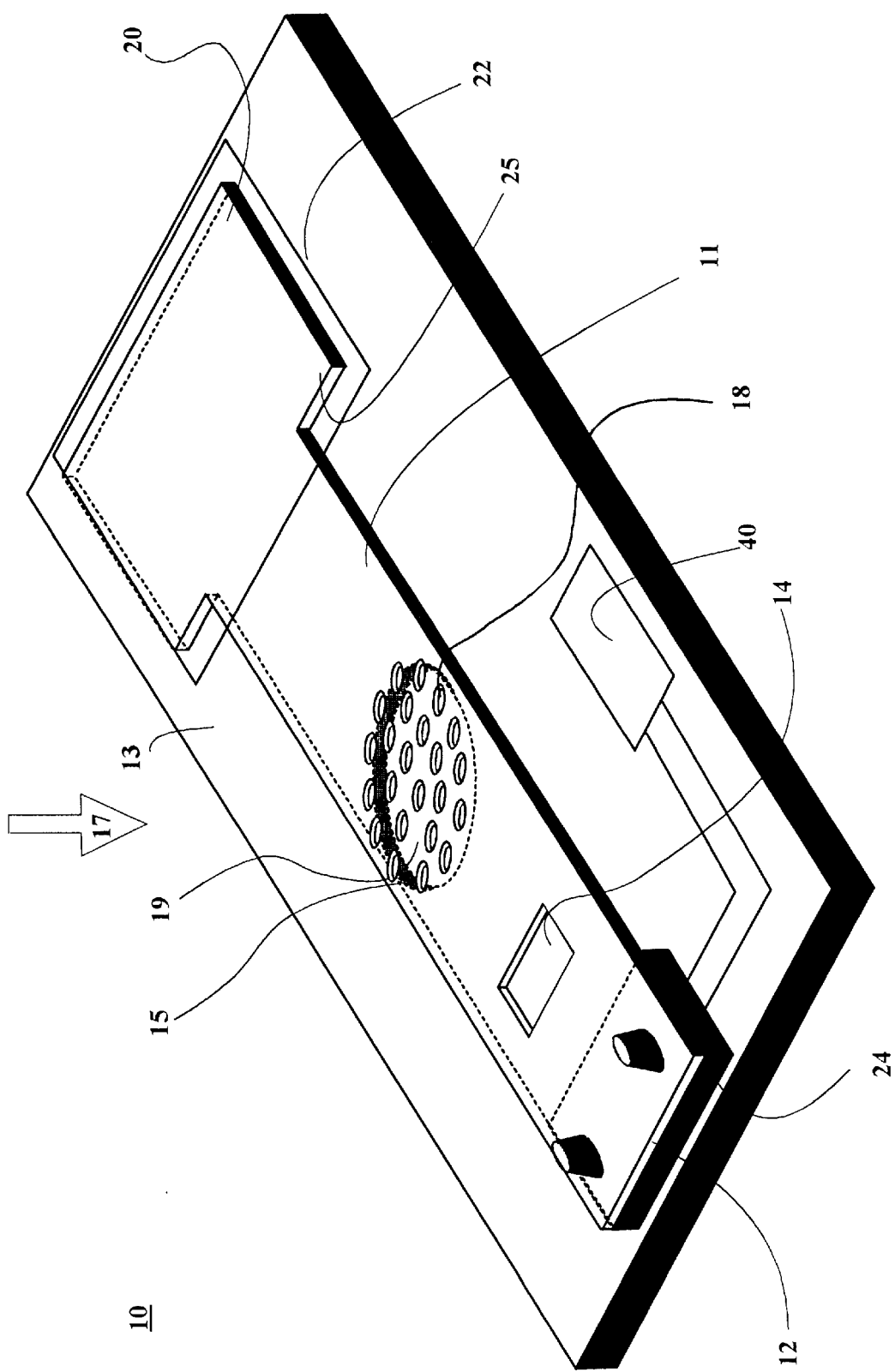
FIG. 2 shows an embodiment similar to FIG. 1 except that it has only a single parallel-plate capacitor rather than the double one of the preferred embodiment.

A floating end 20 of the vane 11 opposite from the fixed end 12 forms part of a capacitive component 21 of the sensor 10. The floating end 20 is a middle plate of the capacitive component 21, while a first capacitive plate 22 and a second capacitive plate 23 form the other major elements of component 21. In this preferred embodiment of the present invention, two capacitors are formed in a complementary arrangement for a highly accurate capacitance measurement. Alternatively, as shown in FIG. 2 second plate 23 may be omitted and a single capacitance measured using end 20 and plate 22 as the two plates of a parallel-plate capacitor. A first spacer 24 between end 12 and the board 13 causes the vane 11 at end 20 to be separated from plate 22 as is necessary. A second spacer 25 separates plate 22 from plate 23 when that plate is used. The spacers 24 and 25 may be formed of any suitable insulative material, including, but not limited to, polytetrafluoroethylene or polycarbonate. Each of plates 22, 23, and end 20 is electrically coupled to active components associated with the board 13.

The use of plates 22 and 23 permits a differential capacitance measurement. Specifically, as gas passes through holes 18, and pass-through hole 19, floating end 20 of the vane 11 bends. The gaps between the respective plates and end 20 change such that one capacitance increases while the other decreases. The plates also create a mechanical restriction on the displacement of the floating end 20. If only plate 22 is used, a single capacitance is obtained. However, it would be advisable to include a mechanical limiter so as to prevent the vane 11 from bending beyond its elastic limit.

The vane 11 is preferably fabricated of stainless steel of substantially uniform thickness chemically etched to achieve a precise shape. The holes 18 are preferably formed through chemical etching. Alternatively, laser etching and even machining may be used to create vane 11. Plate 22 is preferably formed of a conductive material as a component of the board 13, and the entire sensor 10 is preferably mounted on edge when in use, so as to minimize the effects of gravity on bending of the vane 11.

The circuitry used to obtain the gas flow measurements with the sensor 10 is of any suitable type well known to those skilled in the art. Preferably, it includes an oscillator 40, shown in FIG. 2 which uses the measured capacitance as part of its reactive component. The fixed end 12 of the vane 11 is conductively coupled to the oscillator's ground. For single-capacitance operation, plate 22 and end 20 are insulated from adjacent components, while the oscillator 40 is configured with one leg of the measured capacitance grounded. The frequency transmitted by the oscillator 40 as a function of capacitance is the measure used to identify the gas flow value. For dual-capacitance operation, two oscillators 40, 41, shown in FIG. 1 use the two measured capacitances as reactive elements. The resultant gas flow measurement is thereby presented as the difference between the two frequencies. Such a differential system is desirable to minimize the effect of ambient temperature on the measurement. In that case, any change in ambient temperature will similarly affect both oscillators, resulting in a substantial reduction of the temperature effect on the measurement.

Although the present invention has been described with respect to a specific embodiment, it will be apparent to those skilled in the art that variations in materials and configurations are contemplated. Accordingly, such equivalents are deemed to be within the scope of the invention as defined by the following claims.

I claim:

1. A device for determining gas flow rates, the device comprising:
   a. a flexible vane having a fixed end and a conductive section, wherein said fixed end is affixed to a substrate and said conductive section is not fixed, said vane including a flow-restriction section for allowing gas to flow therethrough, wherein said vane is designed to bend when said gas flows through said flow-restriction section;
   b. a capacitive plate proximate to and spaced apart from said conductive section of said vane, wherein said capacitive plate and said conductive section form an element having capacitance varying with bending of said vane; and
   c. means for converting said capacitance varying with the bending of said vane into a flow rate of said gas passing through said flow-restriction section.

2. The device as claimed in claim 1 wherein said means for converting said capacitance includes a circuit board electrically coupled to said conductive section and to said capacitive plate.

3. The device as claimed in claim 2 wherein said substrate is said circuit board, wherein said fixed end of said vane is affixed to a first end of said circuit board and said capacitive plate is affixed to a second end of said circuit board, and wherein a center section of said circuit board includes a pass-through hole adjacent to said flow-restriction section such that said gas passes through said flow-restriction section and said pass-through hole.

4. The device as claimed in claim 2 wherein said capacitive plate is a first capacitive plate, said device further comprising a second capacitive plate electrically connected to said circuit board and spaced from said conductive section of said vane such that said conductive section is positioned between said first capacitive plate and said second capacitive plate.

5. The device as claimed in claim 4 wherein said circuit means includes a first oscillator coupled to said conductive section and to said first capacitive plate, and a second oscillator coupled to said conductive section and to said second capacitive plate.

6. The device as claimed in claim 1 wherein said flow-restriction section includes a plurality of holes.

7. The device as claimed in claim 1 wherein said circuit means includes an oscillator coupled to said conductive section and to said capacitive plate.

8. The device as claimed in claim 1 wherein said vane includes a flex hole located between said fixed end and said flow-restriction section.

9. The device as claimed in claim 1 wherein said vane and said flow-restriction section thereof are fabricated by means of chemical etching.

10. Apparatus for determining a rate of mass flow of a gas by utilizing a variation in static pressure of said gas, said variation in static pressure being associated with a variation in speed of said flow, said apparatus comprising
   (a) one or more components that establish a path for said mass flow, and
   (b) a flow-restricting section deployed in said path so as to cause a spatial variation in speed of said flow as said gas flows along said path,
      wherein said spatial variation in speed generates a net force on said flow-resisting section, said net force being parallel to said flow and functionally related to said rate, and wherein said apparatus includes a means for measuring said net force and wherein one of said components is a generally planar substrate deployable perpendicularly to said flow, said substrate being impervious to said flow except for a substrate throughhole that therefore serves to define a portion of said path.

11. The apparatus described in claim 10 wherein said flow-restricting section comprises a generally planar vane deployed parallel to said substrate, said vane being impervious to said flow except for a region of said vane containing one or more holes, said one or more holes being aligned with said substrate throughhole and having a total cross-sectional area significantly less than that of said substrate throughhole.

12. The apparatus described in claim 11 wherein said vane is affixed to said substrate at a fixed end but is otherwise free to undergo an elastic flexing displacement when exposed to said net force and wherein said means of measuring said net force is directed at determining said flexing displacement.

13. The apparatus described in claim 12 wherein said means of measuring said net force is based on a measurement of a capacitance between said vane and said substrate.

14. The apparatus described in claim 13 wherein said capacitance is measured by incorporating said capacitance into a first oscillator circuit such that said first oscillator circuit oscillates at a first frequency determined in part by said capacitance, said first frequency varying as said capacitance varies.

15. The apparatus described in claim 14 comprising an upper plate parallel to said vane and disposed so that said vane lies between said upper plate and said substrate, said upper plate establishing, in conjunction with said vane, a second capacitance that varies with said flexing displacement.

16. The apparatus described in claim 15 wherein a portion of said vane distant from said path and close to said fixed end is partially cut away so that said flexing displacement is greater for a given magnitude of said net force.

17. The apparatus described in claim 16 wherein said second capacitance is incorporated into a second oscillator circuit such that said second oscillator oscillates at a second frequency determined in part by said second capacitance, said second frequency varying as said second capacitance varies.

18. The apparatus described in claim 17 also including circuitry for outputting a difference frequency equal in magnitude to said first frequency minus said second frequency, said difference frequency being calibrated against said flexing displacement.

19. The apparatus described in claim 18 wherein said first oscillator and said second oscillator are configured so that said first frequency is substantially equal to said second frequency when said flexing displacement is zero.

20. The apparatus described in claim 19 wherein said first oscillator and said second oscillator are both incorporated into said substrate, wherein said substrate is a circuit board with a planar conduction region adjacent to and parallel to a portion of said vane.

21. A method of measuring speed of flow of a gas at very low values of said speed by utilizing a pressure-variation that occurs in moving gas as a function of said speed, said method comprising the following steps:

(a) introducing into said flow a flexible vane that is impermeable to said flow and is fixed at one end;

(b) introducing into said vane a flow-constricting element that for a limited length along said flow causes a reduction in a cross-section of said flow, thereby causing a variation in said speed in and about said limited length;

(c) obtaining a measurement of a net force that arises on said flow-constricting element parallel to said flow where said net force arises from said variation in said speed; and (d) performing a calculation of said speed from said measurement using known flow dynamics.

22. The method of claim 21 except that instead of performing said calculation, one uses a calibration of said force versus said speed, where said calibration has been secured previously by measuring said speed by other means.

23. The method of claim 21 where said measurement of said net force is a capacitance-based determination of a displacement of said flow-restricting element in response to said net force.

* * * * *